Patented Sept. 21, 1954

2,689,860

UNITED STATES PATENT OFFICE 2,689,860

POLYSILYL DERIVATIVES

John B. Rust, Verona, N. J., assignor, by direct and mesne assignments, of one-half to Montclair Research Corporation, a corporation of New Jersey, and one-half to Ellis-Foster Company, a corporation of New Jersey No Drawing. Application August 8, 1950, Serial No. 178,353

31 Claims. (Cl. 260—448.2)

This invention relates to polysilyl derivatives, to compositions containing such derivatives, and to methods of making said derivatives and compositions and to their utilization.

Reaction products, as for example addition products have heretofore been prepared from halosilanes containing an Si-H bond by reaction under heat and pressure with compounds containing olefinic or acetylenic unsaturation. It has been found that the Si-H bond splits and adds across the unsaturated group forming a saturated derivative when an olefinic reactant is employed; and an olefinic derivative when an acetylenic reactant is used, which olefinic derivative is capable of reaction with further Si-H compound to produce a saturated derivative; whereby when an acetylenic reactant is employed either olefinic or saturated products are obtained. The reactions may be catalytic or non-catalytic. And aryl derivatives have been used for the reaction with the Si-H derivative, the —C=C— bond in the ring serving for this purpose. In all instances however, two reactants were required one of which was an Si-H containing compound while the other was a non-silicon containing olefine or acetylene.

Among the objects of the present invention is the production of novel types of silicon derivatives, designated poly silyl derivatives, since they contain at least two silicon atoms per mole, which derivatives are produced from Si-H containing compounds as the only essential reactant present, there being at least one Si-H containing group attached to a carbocyclic ring containing at least one —C=C— bond. Accordingly a reaction is produced between such —C=C— bond present in a carbocyclic compound containing an Si-H bond, with an Si-H bond which may be supplied by the same carbocyclic derivative or a different Si-H compound.

To illustrate more particularly the novel compounds of the present invention, one formulation of such compounds is $$RSiX^1X^2—(R^1SiY^1Y^2)_mH$$

where R is hydrogen or a monovalent hydrocarbon group such as alkyl, alkaryl, aralkyl, aryl, cycloalkyl, etc., $R^1$ is a divalent carbocyclic group such as arylene, alkarylene, dihydroarylene, tetrahydroarylene, etc., $X^1$, $X^2$, $Y^1$ and $Y^2$ are hydrogen, or halogen, or monovalent hydrocarbon groups as aforesaid, and m is an integer 1, 2, 3, 4, etc.

Thus where an aryl dihalosilane is the only essential reactant present and a condensation is carried out with hydrogen being evolved, two, three, four, or more moles of the aryl dihalosilane may condense. Thus using phenyldichlorosilane as exemplary, there are obtained phenyl dichlorsilylphenylenedichlorsilane $$C_6H_5 \cdot SiCl_2 \cdot C_6H_4 \cdot SiCl_2 \cdot H$$

the higher successive derivatives being $$C_6H_5 \cdot SiCl_2 \cdot C_6H_4SiCl_2 \cdot C_6H_4SiCl_2 \cdot H$$

$$C_6H_5 \cdot SiCl_2 \cdot C_6H_4SiCl_2 \cdot C_6H_4SiCl_2 \cdot C_6H_4SiCl_2 \cdot H$$

and in general these derivatives can be formulated as $$C_6H_5SiCl_2—(C_6H_4SiCl_2—)_mH$$

where m is an integer of 1, 2, 3, 4, etc.

Where other aryl groups such as tolyl, o-, m-, or p-xylyls, naphthyl, etc. are substituted for phenyl in the phenyldichlorosilane or other halosilane, corresponding polysilyl derivatives are produced. For example tolyldibromosilane yields $$CH_3 \cdot C_6H_4 \cdot SiBr_2—(CH_3 \cdot C_6H_3 \cdot SiBr_2—)_mH$$

and when m is 1 there is obtained $$CH_3 \cdot C_6H_4 \cdot SiBr_2 \cdot CH_3C_6H_3 \cdot SiBr_2H$$

when m is 2:

$$CH_3 \cdot C_6H_4 \cdot SiBr_2 \cdot C_6H_3 \cdot CH_3 \cdot$$

$$SiBr_2 \cdot C_6H_3 \cdot CH_3 \cdot SiBr_2H$$

etc.

Of course mixtures of different aryl dihalosilanes may be used for condensation, resulting in very complex reaction product mixtures that include various random distributions of the aryl groups. Thus with a mixture of equal moles of phenyldibromosilane and tolydichlorosilane, among the products obtained are $$C_6H_5SiBr_2 \cdot C_6H_4SiBr_2H$$

$$CH_3C_6H_4SiCl_2 \cdot C_6H_3CH_3 \cdot SiCl_2H$$

$$C_6H_5SiBr_2 \cdot C_6H_3CH_3 \cdot SiCl_2H$$

$$CH_3C_6H_4SiCl_2 \cdot C_6H_4SiBr_2H$$

and various combinations of these building unit groups in polysilyl combinations such as $$C_6H_5SiBr_2 \cdot C_6H_3CH_3 \cdot SiCl_2 \cdot C_6H_3CH_3 \cdot SiCl_2H$$

$$C_6H_5 \cdot SiBr_2 \cdot C_6H_3CH_3 \cdot SiCl_2 \cdot C_6H_4SiBr_2H$$

$$CH_3C_6H_4SiCl_2 \cdot C_6H_4SiBr_2 \cdot C_6H_3CH_3 \cdot SiCl_2H$$

Further in such mixtures of two or more such derivatives, redistribution frequently takes place particularly in the presence of substances (catalysts) favoring redistribution so that a stabilized group of derivatives will ultimately be reached for a given set of conditions.

Mixtures of different aryl halosilanes containing an Si-H bond may be used in any desired proportions. Equimolecular proportions have been exemplified above but the mole ratios of one Si-H compound to another may be for example from 9:1 to 1:9 etc. although in general narrower limits of from 3:1 to 1:3 are desirable. Such molar ratios necessarily influence the structural unit make-up of the products obtained and the random distribution of such structural units in the compounds produced.

Aryl groups have been referred to above to illustrate the carbocyclic ring containing at least one —C=C— group. But other carbocyclic radicals may be present in lieu of phenyl, tolyl, xylyl, naphthyl, including cyclohexenyl, cyclopentadienyl, cyclohexadienyl, etc. thus cyclohexadienyl dichlorosilane may be used to give corresponding derivatives $$RSiX^1X^2(R^1SiY^1Y^2)_mH$$

in which R is the cyclohexadienyl group and $R^1$ is the cyclohexadienyl group minus one hydrogen, the $X^1$, $X^2$, $Y^1$ and $Y^2$ and $m$ values being as set forth above.

Since the —C=C— group in the carbocyclic ring will condense with an Si-H bond in an aliphatic derivative as for example in alkyl and cycloalkyl compounds, alkyl halosilanes containing an Si-H bond and cycloalkyl halosilanes containing an Si-H bond, or mixtures of either or both of such derivatives may be employed in the presence of the essential aryl halosilane containing an Si-H bond, to give complex mixtures of mixed derivatives whose complexity will vary with the number and type of reactants and their molar ratios. The alkyl and cycloalkyl halosilanes include compounds which may be generally formulated as $$T_aSiX_bH_c$$

where T is alkyl or cycloalkyl, X is halogen, $a$ is an integer of from 0 to 3, $b$ is from 0 to 3, $c$ is 1 or 2, and $a+b+c$ is 4. When T is zero, the reactant is an inorganic halosilane such as trichlorosilane, dichlorosilane, monochlorosilane which will give products generally formulated as $$SiV_1V_2V_3(R^1SiX_2)_mH$$

where $V_1$, $V_2$, and $V_3$ are hydrogen or halogen such as chlorine or bromine, $R^1$ is arylene and X is halogen. Thus trichlorosilane and phenyldichlorosilane give $$SiCl_3.C_6H_4.SiCl_2.H$$

Other corresponding derivatives include the reaction products $$SiCl_3.R^1SiCl_2H$$

where $R^1$ is cyclohexylene or any other corresponding cycloalkylene group, etc.

When T is alkyl in $T_aSiX_bH_c$ as set forth above, and $a$ is a positive integer, the combinations with the aryl halosilanes containing an Si-H group may vary widely, including for example the reaction of methyl dichlorosilane and phenyl dichlorosilane giving $$CH_3SiCl_2.C_6H_4SiCl_2H$$

other corresponding derivatives being $$C_2H_5SiCl_2.C_6H_4SiCl_2H$$
$$C_6H_{13}SiCl_2.C_6H_4SiCl_2H$$
$$C_{12}H_{25}SiCl_2.C_6H_4SiCl_2H$$
$$C_{16}H_{33}SiCl_2.C_6H_4SiCl_2H$$

and other alkyl derivatives any alkyl being substituted for methyl, etc.

Also of course similar combinations in the poly aryl derivatives are $$CH_3SiCl_2.C_6H_4SiCl_2.C_6H_4SiCl_2H$$
$$C_{10}H_{21}SiCl_2.C_6H_4SiCl_2.C_6H_4SiCl_2.C_6H_4SiCl_2H$$

or similar combinations where any alkyl as set forth above, as from 1 to 18 and higher carbon atoms, replaces methyl or decyl, and halogen other than chlorine replaces the latter, and any aryl or arylene replaced phenylene in the formulations as just given.

Further, in lieu of the arylene groups any other carbocyclic divalent groups may be present in combination with the alkyl derived residues as from reactions involving an alkyl halosilane containing an Si-H group with cycloalkene etc., as in compounds $$RSiX^1X^2\text{—}(R^1SiY^1Y^2)_m\text{—}H$$

where R is any stated alkyl as given above and R' is derived from cyclohexenyl, cyclopentadienyl, cyclohexadienyl, etc.

In any of the combinations given above a cycloalkyl group such as cyclobutyl, cyclopentyl, cyclohexyl, cycloheptyl, cyclooctyl, etc. may replace alkyl. For example the general formulation would be $$RSiX_2\text{—}(R^1SiX_2)_m\text{—}H$$

where R is any cycloalkyl group, $R^1$ is any arylene group as illustrated above or any cycloalkylene, or a divalent group from a cyclo-alkene or a cyclo-alkdiene, or similar groups as illustrated above, X is halogen particularly chlorine or bromine, and $m$ is an integer 1, 2, 3, 4, etc. Thus from cyclohexyl dichlorosilane and phenyl dichlorosilane there is obtained $$C_6H_{11}SiCl_2.C_6H_4.SiCl_2H$$
$$C_6H_{11}SiCl_2.C_6H_4.SiCl_2.C_6H_4SiCl_2H$$

etc.; and from cyclohexyldichlorosilane and cyclohexenyl dichlorosilane, there is produced $$C_6H_{11}SiCl_2.C_6H_{10}SiCl_2H$$
$$C_6H_{11}SiCl_2.C_6H_{10}SiCl_2.C_6H_{10}SiCl_2H$$

etc.; in which any other cycloalkyl as set forth above can replace cyclohexyl and any other carbocyclic divalent radical containing one, two or three —C=C— groups in the ring can replace cyclohexylene.

These compounds as set forth above may be produced in any desired way but are feasibly produced by reaction of an aryl halosilane containing an Si-H group as the essential reactant or similarly such compound where aryl is replaced by any other carbocyclic compound containing at least one —C=C— group but may contain two such —C=C— groups, and of course those containing three such groups in a six membered ring are the aryl derivatives. With such essential reactant there may be included any compound having an Si-H bond which will react with at least one —C=C— bond in the first named essential reactant. The amount of the added secondary Si-H compound may be varied within wide limits but in mole ratios will always be equal to or less than 1:1 mole ratio with the aryl or other carbocyclic halosilane containing an Si-H group. So that an alkyl or cycloalkyl or inorganic halosilane containing an Si-H group may be used with the carbocyclic halosilane containing an Si-H group in mole ratios of from 1:1 to 1:4 and 1:10 and even higher ratios. Examples of producing such compounds will be given below.

Considering the new compounds discussed above which may be generally formulated as $RSiX^1X^2$—$(R^1SiY^1Y^2$—$)_mH$ where R and $R^1$, and $m$ have the meanings set forth above $X^1$ and $X^2$ and $Y^1$ and $Y^2$ have the meaning above, it will be seen that the compound contains an Si—H group and is therefore capable of reacting with any olefine or acetylene, at temperatures of from 50 to 650° C. under superatmospheric pressures of several to ten and higher atmospheres as for example up to 4500 pounds per square inch to give addition products. Catalysts are unnecessary but may be used and include the peroxy catalysts particularly such as organic peroxides like benzoyl peroxide, acetyl peroxide, lauroyl peroxide, etc., per acids such as perbenzoic acid, peracetic acid, etc.

Or the Si—H group may be subjected to hydrolysis as by alkali with or without heat to form the corresponding Si—OH compound which in many instances depending on the molecule to which the Si—OH is attached, is stable. Where unstable, condensation takes place as for example —Si—OH+HO—Si— giving a siloxane. If the $X^1$ and $X^2$, and $Y^1$ and $Y^2$ groups or some of them are halogen, they also will be hydrolyzed at the same time. In some instances the OH formed compounds will be stable even where two OH groups are attached to the same silicon atom. Where unstable, condensation will take place in very deep seated complex reactions enabling a number of derivatives valuable for many purposes to be employed.

Where the $X^1$ and $X^2$, $Y^1$ and $Y^2$ groups are halogen, it is possible to hydrolyze such halogen particularly chlorine or bromine without hydrolyzing the Si—H group hydrogen. In some cases mere contact with water even in the cold as by ice or ice and water at temperatures up to 5 or 10° C. will cause hydrolysis of halogen without hydrolysis of the Si—H hydrogen. Alkalis should be absent as a general rule. Where necessary hydrolysis can be carried out by warming with water or water and acid, and if necessary by steam. Such hydrolyzed products will either be stable OH containing compounds thus having a functional group for further reaction, or condensation may take place to produce siloxane or other oxosilanes or polymers thereof. Organic solvents such as ethers like dimethyl ether, diethyl ether, etc., ketones like acetone, methyl ethyl ketone, esters, etc. may be present during hydrolysis. Reactions of this character become very complex in dealing with the derivatives of the present invention.

Hydrolyzed products may be used in the production of resinous masses for coating, casting and hot pressing; or they may be mixed with other silicon plastics and used for such purposes. Resinous products may be employed as coating materials with other silicon plastics or with natural or other synthetic resins such as copal, shellac, rosin, urea aldehyde resins, phenol aldehyde resins, melamine aldehyde resins, vinyl resins, acrylate and methacrylate resins etc. They may be mixed with cellulose esters and ethers such as nitrocellulose, cellulose acetate, benzyl cellulose, carboxymethylcellulose, as well as with drying, semi-drying and non-drying oils. They may thus be cooked into linseed oil, Chinawood oil etc. They may be employed as lubricants or incorporated into petroleum fraction lubricants, greases, etc.

Or the derivatives before hydrolysis may be used to render textiles and fabrics, paper products, mineral and organic powders, etc., water-repellent by direct treatment with such products when liquid or in solution in volatile organic solvents.

A number of examples will be given to illustrate the various phases of the present invention without attempting to give an example for every feature. Parts are by weight unless otherwise indicated.

I

Phenyl dichlorsilane is heated in a bomb for 8 hours at a temperature of from 450 to 550° C. After cooling, the products are removed, fractionally distilled to remove unreacted material and the residue collected. Products including $C_6H_5SiCl_2.C_6H_4SiCl_2H$ and higher derivatives are produced.

The reaction may be carried out in the same way using an organic liquid solvent for the phenyldichlorsilane.

Instead of phenyldichlorosilane, tolydichlorosilane, naphthyl dichlorosilane etc., as well as cyclohexylene dichlorosilane, may be substituted for the phenyldichlorosilane.

II

A mixture of phenyldichlorosilane and methyldichlorosilane in the mole ratio of 1:1 is heated in a bomb at a temperature of from 400 to 500° C. for seven hours. After cooling, the products are removed, unreacted material distilled off, and the residue consisting largely of $$CH_3SiCl_2.C_6H_4SiCl_2H$$

recovered.

III

A mixture of phenyldichlorosilane and butyldichlorosilane in the mole ratio of 2:1 is heated in a bomb under the same conditions as in Example II. After fractional distillation of unreacted material, a residue containing $$C_4H_9SiCl_2.C_6H_4SiCl_2H$$

was recovered with other material including $$C_4H_9SiCl_2.C_6H_4.SiCl_2.C_6H_4SiCl_2H$$

and $$C_6H_5SiCl_2.C_6H_4SiCl_2H$$

IV

Cyclohexyl dichlorosilane and phenyldichlorosilane in the mole ratio of 1:2 are heated in a bomb at about 540 to 560° C. for eight hours, and a solid residue recovered including $$C_6H_{11}SiCl_2.C_6H_4SiCl_2H$$

V

A mixture of phenyldichlorosilane and silicochloroform in the mole ratio of 1:1 were heated in a bomb at about 400° C. to 450° C. for eight hours, unreacted material fractionally distilled off, and $SiCl_3.C_6H_4SiCl_2H$ recovered from the reaction mixture.

VI

One half mole of phenyldichlorsilyl phenylene dichlorsilane from Example I is placed in a bomb. Ethylene is introduced until the pressure at room temperature is $500\#/\square''$. A temperature of about 300 to 350° C. is maintained for about five hours. Upon cooling, there is recovered $$C_6H_5.SiCl_2.C_6H_4SiCl_2.C_2H_5$$

Instead of separating the phenyldichlorsilyl phenylene dichlorsilane from the reaction mixture, the reaction mixture itself as produced in Example I may be directly subjected to reaction with ethylene or other olefine. Any of the reaction mixtures of Examples II to V or the reaction products segregated therefrom may be reacted with ethylene under the conditions of Example VI.

VII 2-pentene and phenyldichlorsilyl phenylene dichlorsilane from Example I in the mole ratio of 1:1 are placed in a bomb and shaken for 4 hours at 300° C. After cooling, there is obtained from the reaction mixture phenyl dichlorsilyl phenylene dichlor, amyl silane.

VIII

Cyclohexene and the reaction mixture from Example V above without separation of $$SiCl_3.C_6H_4SiCl_2H$$

therefrom in the mole ratio of the latter to cyclohexene of 1:1, are placed in a bomb and heated to about 325 to 350° C. for 4 hours. After cooling and removal of unreacted material the cyclohexyl derivative $SiCl_3.C_6H_4SiCl_2.C_6H_{11}$ is recovered.

IX

1:1 mole ratio of methyldichlorsilyl phenylene dichlorsilane from Example II and styrene are placed in a bomb, sealed and heated for 2 hours at 350° to 380° C. Upon cooling, the desired $$CH_3SiCl_2.C_6H_4SiCl_2.CH_2CH_2C_6H_5$$

is recovered.

In these reactions with an olefine on the polysilyl derivatives containing in Si-H bond, there can be used a wide variety of unsaturated compounds including an ethylenic or acetylenic linkage. Thus there are included olefins, diolefins, and acetylenes, and their derivatives, particularly where the derivatives include substituents such as halogen, for example, fluorine, chlorine and bromine, alkyl or other aliphatic groups, aryl or other carbocyclic groups, unsaturated alicyclic groups such as the cyclo-olefins, and other types of substituent groups including, for example, nitrile, nitro groups, etc. Thus the unsaturated organic compound includes unsaturated hydrocarbons, aliphatic, carbocyclic, alicyclic and heterocyclic, and their derivatives, including unsaturated alcohols, aldehydes, ketones, quinones, acids, acid anhydrides, esters, nitriles, nitro compounds and so on.

The olefins and substituted olefins where the substituent group is halogen, such as fluorine, chlorine, bromine, alkyl, aryl, cyclo-paraffin, etc. as set forth above, include for example, the olefins ethene, propene, butene, pentene, etc. Diolefins and their substituted derivatives include butadiene, chloroprene, cyclopentadiene, divinylbenzene, cyclohexadiene, etc. Cyclo-olefins are also included as well as acetylene, phenylacetylene, etc. As further illustrating the unsaturated derivatives that may be employed, there may be mentioned styrene, ethylvinyl benzene, halogen substituted styrenes, allyl chloride, allyl benzene, vinyl chloride, vinylidine chloride, tetra-fluoroethylene, indene, stilbene, furan examplary of heterocyclic compounds containing unsaturated groups, cyclohexene, etc.

Similarly a variety of acetylenic compounds may be used. It may be generally formulated as $R_1C\equiv CR_2$, in which $R_1$ and $R_2$ may be the same or different groups selected from such groups as hydrogen, aliphatic groups including the alkyl groups and olefinyl or alkylene groups, carbocyclic groups including the aryl groups for example, cyclo-aliphatic groups such as cyclohexyl or oxy groups such as $OR^3$, where $R^3$ is hydrogen, alkyl, aryl, etc. as set forth above. As exemplary of such compounds there may be mentioned acetylene, vinyl acetylene, (acetylene dimer), pentine-1, hexine-1, ethyl propyl acetylene $$(C_3H_7C\equiv CC_2H_5)$$

etc., phenyl acetylene.

The reaction of the polysilyl derivative containing an Si-H bond with an acetylene may be generally formulated as $$(Z\equiv)SiH + R_1C\equiv CR_2 \rightarrow (Z\equiv)SiCR_1=CHR_2$$

in which $(Z\equiv)SiH$ represents any polysilylaryl derivative containing an Si-H bond as described above and $R_1C\equiv CR_2$ is an acetylene in which $R_1$ and $R_2$ may be hydrogen, or a monovalent hydrocarbon radical as exemplified hereinabove, or other substituent groups.

As explained, the resulting vinyl derivative of the polysilyl compound may react with another mole of an Si-H SiH compound which may be the same as that in the first step or may be a different SiH compound also as exemplified above. If the same SiH compound is used for both stages, the reaction may be $$(Z\equiv)SiCR_1=CHR_2 + (Z\equiv)SiH \rightarrow$$
$$(Z\equiv)SiCR_1H.CHR_2.Si(\equiv Z)$$

where the terms have the meaning set forth above.

Where different SiH compounds are used in the two stages:

$$(Z\equiv)SiCR_1=CHR_2 + (Z^1\equiv)SiH \rightarrow$$
$$(Z\equiv)SiCR_1H.CHR_2.Si(\equiv Z^1)$$

the terms having the meaning set forth above, $Z^1$ representing the remainder of the molecule of the second Si-H compound.

It should be noted that separate two stage reactions are not essential since the last mentioned products may be produced in a single stage.

To exemplify the acetylenic reaction the following are noted, parts by weight unless otherwise indicated.

X

Into a pressure reactor are charged pentine-1 and phenyl dichlorsilyl phenylene dichlorsilane from Example I in the mole ratio of 1:1, the reactor sealed, heated to about 300 to 320° C. and shaken for about 4 hours. It is then cooled and opened. Among the reaction products is phenyl dichlorsilyl phenylene dichlorsilyl pentene and bis (phenyl dichlorsilyl phenylene dichlorsilyl) pentane.

Other acetylenes may be substituted for pentine-1 in Example X in equivalent amounts including acetylene, hexine-1, vinyl acetylene, and phenyl acetylene. Temperatures of reaction may vary from 0° C. to 650° C. and pressures from atmospheric to 4500 p. s. i. Catalysts such as organic peroxy catalysts mentioned above may be used or ultra-violet light. The mole ratios of the reactants may vary over wide limits as from 4:1 to 1:4 and other ratios also employed.

Having thus set forth my invention, I claim:
1. A compound having the formula $$RSiX^1X^2-(R^1SiY^1Y^2-)_mH$$

where R is selected from the group consisting of hydrogen and monovalent hydrocarbon groups free of aliphatic unsaturation, $R^1$ is a divalent carbocyclic group containing carbon and hydrogen only, and $X^1$ and $X^2$ and $Y^1$ and $Y^2$ are selected from the group consisting of hydrogen, halogen, and monovalent hydrocarbon groups, and $m$ is an integer.

2. A compound as in claim 1 in which R is a monovalent hydrocarbon group free of aliphatic unsaturation, $X^1$ and $X^2$, and $Y^1$ and $Y^2$ are halogen, $R^1$ is phenylene and $m$ is from 1 to 4.

3. A compound as in claim 1 in which R is alkyl, $X^1$ and $X^2$, and $Y^1$ and $Y^2$ are halogen, and $R^1$ is phenylene.

4. A compound as in claim 3 in which $X^1$ and $X^2$, and $Y^1$ and $Y^2$ are chlorine and $R^1$ is phenylene.

5. A compound as in claim 1 in which R is aryl, $X^1$ and $X^2$ and $Y^1$ and $Y^2$ are halogen, and $R^1$ is phenylene.

6. A compound as in claim 1 in which R is cycloalkyl, $X^1$ and $X^2$, and $Y^1$ and $Y^2$ are halogen, and $R^1$ is phenylene.

7. A compound as in claim 1 in which R is alkyl, $R^1$ is cycloalkylene, $X^1$, $X^2$, $Y^1$, and $Y^2$ are halogen.

8. A compound as in claim 7 in which $R^1$ is cyclohexylene, $X^1$, $X^2$, $Y^1$ and $Y^2$ are chlorine.

9. A compound as in claim 1 in which R is aryl, $R^1$ is cycloalkylene, $X^1$, $X^2$, $Y^1$ and $Y^2$ are halogen.

10. A compound as in claim 9 in which $R^1$ is cyclohexylene, $X^1$, $X^2$, $Y^1$ and $Y^2$ are chlorine.

11. A compound as in claim 1 in which R is cycloalkyl, $R^1$ is cycloalkylene, $X^1$, $X^2$, $Y^1$ and $Y^2$ are halogen.

12. A compound as in claim 11 in which $R^1$ is cyclohexylene, $X^1$, $X^2$, $Y^1$ and $Y^2$ are chlorine.

13. A halogen-only hydrolyzed product from a halogen containing compound as claimed in claim 1, hydrolyzed by treatment with water.

14. A halogen-and-hydrogen-only hydrolyzed product from a halogen containing compound as claimed in claim 1, hydrolyzed by treatment with aqueous alkali.

15. The method of producing polysilyl derivatives which consists in heating at a temperature of from 50° C. to 650° C. under superatmospheric pressure, an organohalosilane containing an Si-H bond in which the organo group is a carbocyclic group containing carbon and hydrogen only and containing at least one —C=C— bond in the ring.

16. The method which comprises hydrolyzing a halogen containing product of claim 1 by treatment with a hydrolyzing agent selected from the group consisting of water and aqueous alkalis.

17. A halogen-only hydrolyzed product of a halogen containing compound as claimed in claim 1 in which R and R' are alkyl and phenylene respectively, hydrolyzed by treatment with water.

18. A halogen-only hydrolyzed product of a halogen containing compound as claimed in claim 1 in which R and R' are aryl and arylene respectively, hydrolyzed by treatment with water.

19. A halogen-only hydrolyzed product of a halogen containing compound as claimed in claim 1 in which R and R' are cycloalkyl and arylene respectively, hydrolyzed by treatment with water.

20. A halogen-only hydrolyzed product from a halogen containing compound as claimed in claim 1 in which R and R' are alkyl and cyclohexylene respectively, hydrolyzed by treatment with water.

21. A halogen-only hydrolyzed product from a halogen containing compound as claimed in claim 1 in which R and R' are aryl and cyclohexylene respectively, hydrolyzed by treatment with water.

22. A halogen-and-hydrogen-only hydrolyzed product from a halogen containing compound as claimed in claim 1 in which R and R' are alkyl and phenylene respectively, hydrolyzed by treatment with aqueous alkali.

23. A halogen-and-hydrogen-only hydrolyzed product from a halogen containing compound as claimed in claim 1 in which R and R' are aryl and arylene respectively, hydrolyzed by treatment with aqueous alkali.

24. A halogen-and-hydrogen-only hydrolyzed product from a halogen containing compound as claimed in claim 1 in which R and R' are cycloalkyl and arylene respectively, hydrolyzed by treatment with aqueous alkali.

25. A halogen-and-hydrogen-only hydrolyzed product from a halogen containing compound as claimed in claim 1 in which R and R' are alkyl and cyclohexylene respectively, hydrolyzed by treatment with aqueous alkali.

26. A halogen-and-hydrogen-only hydrolyzed product from a halogen containing compound as claimed in claim 1 in which R and R' are aryl and cyclohexylene respectively, hydrolyzed by treatment with aqueous alkali.

27. The method which comprises hydrolyzing a halogen containing product of claim 1 by water alone to give a halogen-only hydrolyzed product, the product subjected to hydrolysis being that in which R and R' are alkyl and phenylene respectively.

28. The method which comprises hydrolyzing a halogen containing product of claim 1 by water alone to give a halogen-only hydrolyzed product, the product subjected to hydrolysis being that in which R and R' are aryl and arylene respectively.

29. The method which comprises hydrolyzing a halogen containing product of claim 1 by water alone to give a halogen-only hydrolyzed product, the product subjected to hydrolysis being that in which R and R' are cycloalkyl and arylene respectively.

30. The method which comprises hydrolyzing a halogen containing product of claim 1 by water alone to give a halogen-only hydrolyzed product, the product subjected to hydrolysis being that in which R and R' are alkyl and cyclohexylene respectively.

31. The method which comprises hydrolyzing a halogen containing product of claim 1 by water alone to give a halogen-only hydrolyzed product, the product subjected to hydrolysis being that in which R and R' are aryl and cyclohexylene respectively.

References Cited in the file of this patent

UNITED STATES PATENTS

| Number | Name | Date |
|---|---|---|
| Re. 23,270 | Clark | Sept. 26, 1950 |
| 2,383,817 | Rochow | Aug. 28, 1945 |
| 2,511,820 | Barry | June 13, 1950 |
| 2,545,780 | Hatcher | Mar. 20, 1951 |
| 2,557,782 | Clark | June 19, 1951 |
| 2,557,931 | Barry | June 26, 1951 |